G. S. CUCCHIARA.
NONSKID APPLIANCE.
APPLICATION FILED JAN. 11, 1921.
1,424,882.
Patented Aug. 8, 1922.
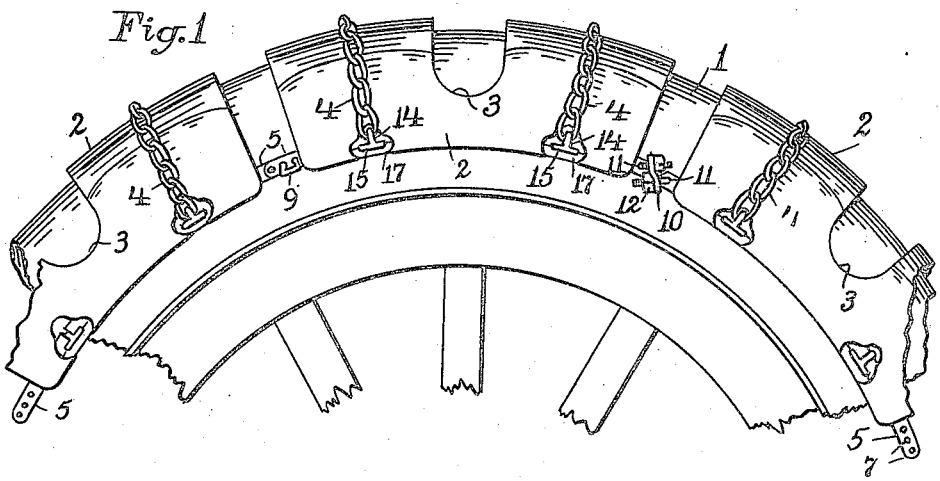
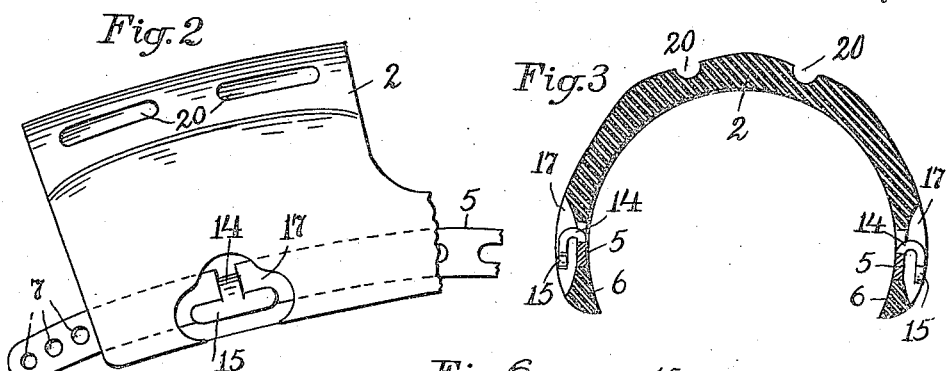
Inventor,
Giovanni S. Cucchiara;
By
Attorney.

UNITED STATES PATENT OFFICE.

GIOVANNI S. CUCCHIARA, OF NEEDHAM, MASSACHUSETTS.

NONSKID APPLIANCE.

1,424,882.　　　　　Specification of Letters Patent.　　Patented Aug. 8, 1922.

Application filed January 11, 1921.　Serial No. 436,577.

*To all whom it may concern:*

Be it known that I, GIOVANNI S. CUCCHIARA, a citizen of the United States, and a resident of the town of Needham, in the county of Norfolk and Commonwealth of Massachusetts, have invented certain new and useful Improvements in Nonskid Appliances, of which the following is a full, clear, and exact specification.

This invention has for its object the effecting of certain improvements in the general type of overtires set forth in Letters Patent of the United States granted to me December 7, 1920, and numbered 1,361,022; and relates to more economical and efficient means for attaching the overtire pads to each other and for adjusting them upon the tire; to the means for attaching non-skid chains to the pads; to means for firmly securing the attaching bars within the pads, and to other details of construction hereinafter set forth.

In the drawings forming part of this specification, Fig. 1 is a side view of a part of an automobile wheel having my pads secured thereon. Fig. 2 is a side view on a larger scale of part of one of the pads. Fig. 3 is a cross section of the same. Fig. 4 is an edge view of one of the attaching bars. Fig. 5 is a like view of another of the attaching bars. Fig. 6 is a side view of one of said bars and of a part of another attached thereto. Fig. 7 is a perspective view of a part of a bar showing a chain-hook. Fig. 8 is a perspective view of a hook-staple. Fig. 9 is a perspective view of the adjusting device.

The reference numeral 1 designates the tire of an automobile wheel, about which tire are secured the pads 2 enclosing the tread and sides thereof. I prefer to provide eight of these pads, each being notched at midlength, as at 3, to increase the road-engaging edges. The traction is further increased by means of the short sections of chain 4 passed over each half of each pad.

For attaching these pads 2 together, a metal bar 5 is molded in each flap 6 of each pad, and provided with eyes 7 in its protruding ends, preferably three at each end. One end is offset somewhat, as shown at the left hand of Fig. 5, to enable the other bar to lie in the same plane with the first bar. Through two of the eyes 7 of each of two overlapping ends is introduced a staple 9 bent into a hooked form, as shown in Fig. 8. After such staples have been put in place, the pressure of the tire 1 against them prevents their working loose. By altering the positions of these staples, the total circumference of the overtire can be materially adjusted to fit three different sizes of tire.

For tightening the overtire upon a tire, the device illustrated in Fig. 9 is employed. This comprises a block 10 having two screw hooks 11 run transversely through it and adjusted by nuts 12. These hooks having been engaged with eyes 7 of two adjacent ends of the bars 5, the nuts can be turned until the desired degree of tension is obtained.

The bars 5 are retained firmly in place within the pads by means of the slots 13 formed in the bars, through which the rubber is forced during the molding of the pads.

For anchoring the chain sections 4, each bar 5 has stamped therefrom two T-shaped hooks 14, as shown in Figs. 4 and 7. For engaging a terminal link with a hook 14, the link is turned at right angles to the general direction of the chain, to present its longest diameter to the cross piece 15 thereof. After being passed over the cross piece, the link is swung into alinement with the general direction of the chain, and the latter is thereby made secure in its terminal attachment to the pad,—it being understood that the opposite end of the chain is attached to a hook 14 in the same manner. As shown in Figs. 4 and 5, the portion of the bar 5 from which each hook 14 springs, as at 16, is offset in order that the hooks shall not project so far beyond the face of the bar; and when these bars are molded in a pad 2, the main body of each bar is midway of the interior and exterior of the pad portion, while the offset parts 16 are flush with the interior, as indicated in Fig. 3, and the hooks are flush with the exterior thereof. The pads are cut away for a limited distance around each hook, as at 17, to permit the engagement of the chains therewith. The rubber is preferably permitted to approach so closely to the ends of the cross-pieces 15 as to require a pressing back of the rubber in engaging the links with the cross-pieces.

I do not provide every bar 5 with a terminal offset 8, but only every alternate bar, one bar having an offset as shown in Fig. 5, and the adjacent one being terminally straight, as shown in Fig. 4. This is done because I prefer to use four of the adjusting devices 10, 11, one between every pair and an adjacent pair of bars. In other words, there are two attached bars 5, then a fastening device 10, 11, then two more bars, another fastening device, and so on around the tire.

By giving each plate 10 a reverse bend 19 at its mid-length, I am enabled to draw the bar-ends nearer together and thereby increase the degree of adjustability, as compared with having the plate 10 entirely flat.

For preventing skidding when no chains are used, the pads 2 are formed with the grooves 20, as shown in Figs. 2 and 3; for this anti-skid appliance is designed to be used either with or without the chains 4, depending upon the weather and conditions of the roadway, it being a comparatively simple operation to apply and remove the chain sections.

Thus constructed, my non-skid appliance is readily adjusted to fit several sizes of tires; it can be clamped tightly and securely thereon; it can be used either with or without chains; is durable and effective in use, and neat in appearance.

What I claim is:

1. A non-skid appliance comprising a pad, a bar imbedded therein near each edge, each bar having a hook projecting therefrom, the hook having its outermost surface within the plane of the exterior of the pad and the rubber being absent for a limited distance about the hook, and a chain section having its terminal links engaged by two oppositely disposed hooks, whereby said hooks do not project beyond the lateral surface of the pads and hence cannot be injured by engagement with a curbstone.

2. A non-skid appliance comprising a pad, a bar imbedded therein near each edge, and a hook projecting from each bar, each hook having a terminal cross-piece, and a chain having its terminal links adapted to be engaged by said cross-pieces, whereby a link cannot be disengaged from its associated cross-piece without turning the link to a position at right angles to its normal position.

3. A non-skid appliance comprising a series of pads, bars imbedded therein, and means for fastening said bars one to another embracing a plate having a transverse hole near each end, a hook slidable in each hole, each hook having a threaded stem and a nut thereon, these hooks being adapted to be engaged with adjacent ends of two bars.

4. A non-skid appliance comprising a series of pads, bars imbedded therein and terminally projecting therefrom, and means for attaching said bars one to another embracing an offset plate having a hole near each end, a hook having a threaded stem slidable in each hole, and a nut turning on each stem, said hooks being adapted to be engaged with adjacent ends of two bars.

In testimony that I claim the foregoing invention, I have hereunto set my hand this 10th day of January, 1921.

GIOVANNI S. CUCCHIARA.